UNITED STATES PATENT OFFICE.

BENNO HOMOLKA, OF FRANKFORT-ON-THE-MAIN, GERMANY, ASSIGNOR TO THE FARBWERKE, VORM. MEISTER LUCIUS & BRÜNING, OF HÖCHST-ON-THE-MAIN, GERMANY.

PROCESS OF MAKING INDIGO.

SPECIFICATION forming part of Letters Patent No. 669,794, dated March 12, 1901.

Application filed January 2, 1901. Serial No. 41,771. (No specimens.)

*To all whom it may concern:*

Be it known that I, BENNO HOMOLKA, Ph.D., a citizen of the Empire of Austria-Hungary, residing at Frankfort-on-the-Main, in the Empire of Germany, have invented certain new and useful Improvements in the Manufacture of Indigo, of which the following is a specification.

I have found a new process for the manufacture of indigo. It consists in heating at a high temperature a mixture of ortho-chloro-benzoic acid and glycocol, (amidoacetic acid,) preferably in form of their alkali salts, with caustic alkalies and in dissolving the mass when cold and subjecting the solution to oxidation, whereupon indigo separates.

I illustrate my process as follows: Two parts, by weight, of ortho-chloro-benzoic acid and one part, by weight, of glycocol are thoroughly mixed in form of their dry alkali salts with one to two parts of pulverized sodium hydroxid or potassium hydroxid, and the mixture is heated in a suitable vessel, preferably without access of air. The temperature of the mass rises rapidly to about 200° centigrade. The mass is then further heated at 150° to 250° centigrade until it becomes a deep orange-yellow. It is then allowed to cool, and the product is dissolved in water, which is cooled meanwhile. It is preferable to introduce carbonic acid until the alkali is saturated therewith. The solution thus obtained is then filtered, whereupon air is introduced into the filtrate while it is heated. The indigo now separates. It is collected on a filter, washed, pressed, and dried.

Instead of oxidizing the indigo-leuco solution with air, as described, the solution may be slightly acidified and oxidized with a suitable oxidizing agent—such, for instance, as a ferric salt or persulfate.

In the above example the equivalent quantity of ortho-bromo-benzoic acid may be substituted for ortho-chloro-benzoic acid. Instead of sodium or potassium hydroxid a mixture of both may also be employed. Alkaline earths may also be partly or wholly substituted for them.

Having now described my invention, what I claim is—

The herein-described process for the manufacture of indigo, which consists in heating a mixture of ortho-chloro-benzoic acid and glycocol with an excess of caustic alkalies and in subjecting the product of reaction thus obtained to oxidation in an aqueous solution, substantially as set forth.

In testimony that I claim the foregoing as my invention I have signed my name in presence of two subscribing witnesses.

BENNO HOMOLKA.

Witnesses:
HEINRICH HAHN,
BERNHARD LYDECKER.